(12) United States Patent  
Siegel

(10) Patent No.: US 8,937,395 B2
(45) Date of Patent: Jan. 20, 2015

(54) OCEAN FLOOR MOUNTING OF WAVE ENERGY CONVERTERS

(75) Inventor: Stefan G. Siegel, Pueblo, CO (US)

(73) Assignee: Atargis Energy Corporation, Pueblo, CO (US)

( * ) Notice: Subject to any disclaimer, the term of this patent is extended or adjusted under 35 U.S.C. 154(b) by 54 days.

(21) Appl. No.: 13/570,018

(22) Filed: Aug. 8, 2012

(65) Prior Publication Data

US 2014/0042749 A1 Feb. 13, 2014

(51) Int. Cl.
*F03B 13/10* (2006.01)
*F03B 13/12* (2006.01)
*H02P 9/04* (2006.01)

(52) U.S. Cl.
USPC .......................................................... 290/53

(58) Field of Classification Search
USPC .......................................................... 290/53
See application file for complete search history.

(56) References Cited

U.S. PATENT DOCUMENTS

| 4,023,041 | A | * | 5/1977 | Chappell ........................ 290/53 |
| 4,180,367 | A | * | 12/1979 | Drees ............................ 416/119 |
| 4,235,405 | A | * | 11/1980 | Carey ........................ 248/123.11 |
| 4,247,251 | A | * | 1/1981 | Wuenscher ...................... 416/24 |
| 4,368,392 | A | * | 1/1983 | Drees ............................ 290/54 |
| 4,390,933 | A | * | 6/1983 | Warshawsky ................ 362/270 |
| 4,411,632 | A | * | 10/1983 | Wuenscher et al. ........... 440/93 |
| 4,428,712 | A | * | 1/1984 | Wuenscher et al. ............. 415/7 |
| 4,430,044 | A | * | 2/1984 | Liljegren ...................... 416/119 |
| 4,484,255 | A | * | 11/1984 | Warshawsky ................ 362/396 |
| 4,577,819 | A | * | 3/1986 | Bennett .................... 248/123.11 |
| 4,672,222 | A | * | 6/1987 | Ames ............................. 290/53 |
| 4,692,850 | A | * | 9/1987 | LeDoux ....................... 362/432 |
| 5,253,832 | A | * | 10/1993 | Bolas et al. .............. 248/123.11 |
| 5,912,625 | A | * | 6/1999 | Scofield ........................ 340/665 |
| 6,768,217 | B2 | * | 7/2004 | Chalmers et al. ............... 290/53 |
| 7,195,214 | B2 | * | 3/2007 | Lee et al. .................... 248/125.8 |
| 7,339,285 | B2 | | 3/2008 | Negron Crespo ............... 290/53 |
| 7,389,963 | B2 | * | 6/2008 | Cho et al. ....................... 248/159 |
| 7,392,969 | B2 | * | 7/2008 | Chiu et al. ..................... 248/676 |
| 7,425,772 | B2 | * | 9/2008 | Novo Vidal .................... 290/52 |
| 7,686,583 | B2 | | 3/2010 | Siegel ........................... 416/111 |
| 7,762,776 | B2 | | 7/2010 | Siegel ........................... 416/111 |
| 7,948,107 | B2 | * | 5/2011 | Fraenkel ....................... 290/54 |
| 8,100,650 | B2 | | 1/2012 | Siegel ............................. 416/53 |
| 8,354,758 | B1 | * | 1/2013 | Boschma ....................... 290/54 |
| 8,581,432 | B2 | | 11/2013 | Rohrer .......................... 290/53 |
| 8,604,631 | B2 | | 12/2013 | Rohrer .......................... 290/42 |
| 8,614,520 | B2 | | 12/2013 | Rohrer .......................... 290/42 |
| 2007/0036641 | A1 | * | 2/2007 | McNabb et al. .............. 415/4.2 |
| 2008/0088135 | A1 | * | 4/2008 | Novo Vidal .................... 290/54 |
| 2009/0121487 | A1 | * | 5/2009 | Fraenkel ....................... 290/53 |
| 2010/0109330 | A1 | * | 5/2010 | De La Cruz Blazquez .... 290/53 |
| 2012/0169056 | A1 | * | 7/2012 | Peed ............................ 290/53 |
| 2013/0226349 | A1 | * | 8/2013 | Siegel ........................... 700/275 |
| 2014/0042748 | A1 | * | 2/2014 | Siegel ........................... 290/53 |

FOREIGN PATENT DOCUMENTS

GB 2472625 A 2/2011

\* cited by examiner

*Primary Examiner* — Pedro J Cuevas
(74) *Attorney, Agent, or Firm* — David Millers

(57) ABSTRACT

A system for mounting a set of wave energy converters in the ocean includes a pole attached to a floor of an ocean and a slider mounted on the pole in a manner that permits the slider to move vertically along the pole and rotate about the pole. The wave energy converters can then be mounted on the slider to allow adjustment of the depth and orientation of the wave energy converters.

17 Claims, 7 Drawing Sheets

OCEAN FLOOR MOUNTING OF WAVE ENERGY CONVERTERS

FEDERALLY SPONSORED RESEARCH OR DEVELOPMENT

This invention was made with government support under Contract No. DE-EE0003635 awarded by the Department of Energy. The government has certain rights in the invention.

BACKGROUND

Wave energy converters can convert energy from ocean waves into more easily used forms of energy such as electricity. For best operation, a wave energy converter generally needs to be positioned in the ocean at an appropriate depth. Typically, the desired depth of a wave energy converter is at or near the surface of the ocean, while the wave energy converter may be in ocean water that is hundreds of meters deep or more. Some types of wave energy converters also need to be oriented in a direction that is appropriate for the incoming ocean waves. For example, a cycloidal wave energy converter (CycWEC) may employ one or more hydrofoils connected to a central shaft by respective lever arms. In operation, waves passing a CycWEC cause water flows that interact with the hydrofoils and creates lift forces that rotate the hydrofoils and the central shaft, and for efficient operation, the span of the hydrofoils need to be parallel to the wave crest. Accordingly, wave energy converts may need mooring systems that can secure the wave energy converters in some fashion that prevents unwanted motion of the converters but that also permits adjustment to accommodate tides and changes in the ocean waves. A mooring for a wave energy converter may also need to allow for protection of the wave energy converter during storms or high seas, provide for repair or replacement of a wave energy converter, and cause only acceptable environmental changes.

SUMMARY

In accordance with an aspect of the invention, a system for mounting a set of wave energy converters in the ocean includes a pole attached to a floor of an ocean and a slide mount on the pole in a manner that permits the slider to move vertically along the pole and rotate about the pole. The wave energy converters can then be mounted on the slider to allow adjustment the depth and orientation of the wave energy converters.

In accordance with another aspect of the invention, a process includes mounting a cluster of wave energy converters on a slider that engages a pole. The slider can then be slid vertically along the pole to adjust a depth at which the wave energy converters are submerged or rotated about the pole to orient the wave energy converters for a direction of incoming waves.

BRIEF DESCRIPTION OF THE DRAWINGS

Use of the same reference symbols in different figures indicates similar or identical items.

DETAILED DESCRIPTION

A mooring system for one or more wave energy converters (WECs) can employ an ocean floor attachment, a pole, and a slider. The slider allows vertical movement on the pole as needed to adjust the depth of the WECs and allows rotation about the pole as needed to adjust the orientation of the WECs for the current direction of propagation of incoming waves.

Figure 1A:
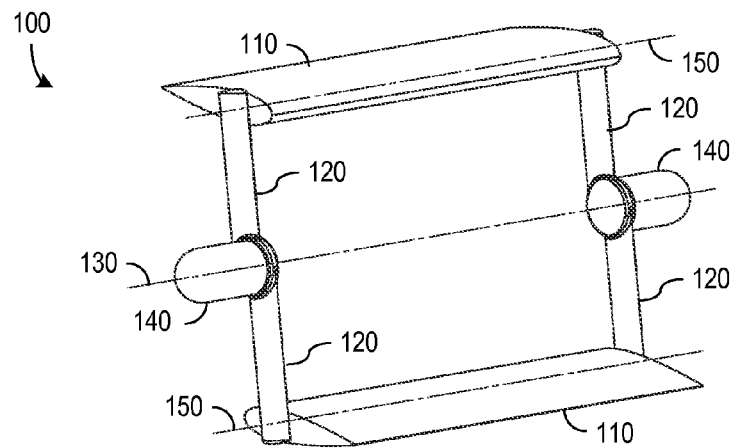
FIGS. 1A, 1B, and 1C show examples of cycloidal wave energy converters.

FIG. 1A shows an example of a cycloidal wave energy converter (CycWEC) 100 that can be deployed at an ocean location using a mooring system such as described further below. CycWEC 100 employs hydrofoils or blades 110 on radial struts or arms 120 that offset blades from a central axis 130 of CycWEC 100. In the illustrated embodiment, CycWEC 100 includes an opposing pair of blades 110, but more generally, a CycWEC could employ one or more blades 110 with each blade 110 being mounted on one or more radial arms similar to radial arms 120. Radial arms 120 can rotate about central axis 130, e.g., as a result of lift forces that ocean waves apply to blades 110, and radial arms 120 are connected to drive shafts of one or more electrical generators 140 capable of producing electrical power from the rotation of blades 110. Blades 110 are also able to rotate about respective pitch axes 150. For example, a computer system (not shown) operating an actuation system that may be provided in arms 120 or blades 110 can control pitch rotation of blades 110 about respective axes 150 as radial arms 120 rotate about central axis 130. In particular, rotations about pitch axes 150 can vary the pitch of blades 110 as blades 110 rotate about central axis 130. The variation in the pitch may be periodic with a period selected according to the period of rotation arms about axis 130, and the variation of the pitch of a blade 110 is sometimes referred to herein as the pitching cycle of the blade 110. The particular pitching cycles used at any particular time in a CycWEC such as CycWEC 100 can be selected to achieve different performance objectives. For example, U.S. Pat. No. 7,762,776, entitled "Vortex Shedding Cyclical Propeller" describes how a pitching cycle can be selected for efficient conversion of wave energy, and U.S. Pat. No. 8,100, 650 describes how pitching cycles can be selected to control reactive forces encountered during conversion of wave energy. In one operating mode, the pitch cycle for a blade 110 holds the blade 110 at a constant pitch angle that can be selected according to characteristics of incoming waves. U.S. patent application Ser. No. 13/405,267, entitled "Efficient Wave Energy Conversion using Cycloidal Turbines," further describes efficient operation of CycWEC using a constant pitch angles and is hereby incorporated by reference in its entirety.

WEC 100 is entirely submerged below the water surface when in operation and interacts with the waves due to the lift produced by blades 110. While this is advantageous in terms of avoiding excessive loads imposed by wind and breaking waves in a storm, access to WEC 100 for servicing may be difficult.

Figure 1B:
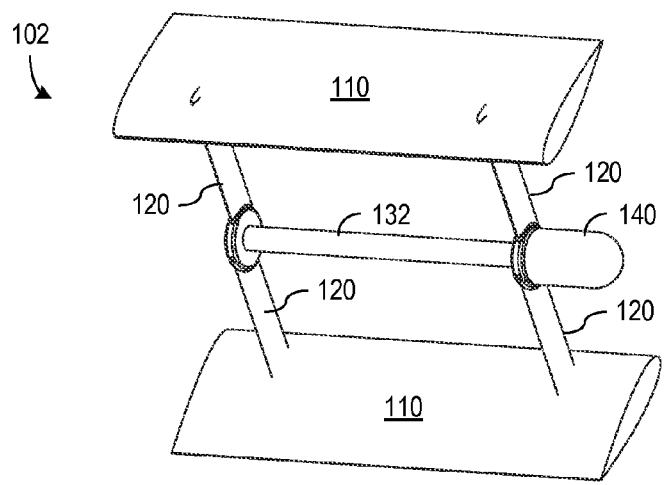

CycWEC 100 of FIG. 1A may be deployed with structural support on both sides in order to provide counter torques for both generators 140 as well as restraining forces to counter the lift force generated by hydrofoils 110 of generators 140. FIG. 1B shows a CycWEC 102 that may be better for mounting from one side only. In lieu of the second generator, CycWEC 102 includes a single generator 140 and uses a central shaft 132 around which hydrofoils 110 revolve. Shaft 132 transmits torque from both sets of arm 120 to generator 140 and also sustains a bending load due to hydrofoil lift which may be centered on the span of blades 110. This allows arms 120 to be moved towards the center of hydrofoils 110, reducing the bending moment on both hydrofoils 110 and shaft 132. In contrast, arms 120 in CycWEC 100 of FIG. 1A connect to the ends of blades 110, which could also be used in CycWEC 102 but at the cost of increasing the bending torque.

Figure 1C:
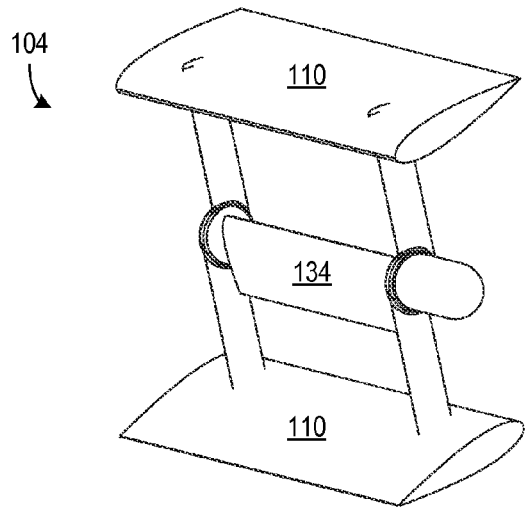

Central shaft 132 is a bluff body from a hydrodynamic perspective and may obstruct the wave induced flow, and the obstruction of flow may degrade performance of the WEC 132, especially if vortex shedding occurs at shaft 132. FIG. 1C shows another alternative CycWEC 104 which is similar to CycWEC 102 but has a central shaft 134 that is either has a hydrofoil shape or is faired with a hydrofoil shaped fairing. While the hydrofoil shaped shaft will always be aligned in the same direction with respect to the struts and hydrofoils, a fairing may be free to rotate relative to the shaft in its center. In operation, a hydrofoil-shape shaft or fairing may yield the same effect, which is prevention of vortex shedding downstream of shaft 134. When shut down in a wave induced flow field, however, the hydrofoil shaped shaft will produce lift since the wave induced velocity will provide for different angles of attack throughout a wave passage. This may be undesirable since WEC 104 may still attempt to rotate even when blades 110 are being feathered. The freely rotating fairing avoids this problem by rotating to align itself with the wave induced flow when WEC 104 is shut down. On the other hand, the rotating fairing may be structurally less efficient and mechanically more complex than the hydrofoil shaped shaft.

A CycWEC such as shown in FIGS. 1A, 1B, and 1C may require mounting or mooring structures for ocean deployment to oppose net forces applied to the CycWEC. In particular, a side effect of the conversion of wave energy into shaft power in WECs 100, 102, and 104 is both a reactive torque at the generator or generators 140 and a reactive force normal to central axis 130 or shaft 132 or 134 of the WEC 100, 102, or 104. The reactive force is generally the vector sum of the lift and drag forces generated by each hydrofoil 110. One mode of operation of CycWEC 100, 102, or 104 maintains hydrofoils 110 with pitch angles of equal magnitude but opposite sign, so that lift forces on hydrofoils 110 approximately add up to a reactive force at shaft 132 or 134 that is twice the force on one blade 110. This reactive force changes direction in synchronization with the rotation of the CycWEC and may need to be sustained by a mounting system holding the generator(s) 140 in place. This mounting requirement can pose a significant engineering challenge, particularly for wave energy conversion of deep ocean wave. For a typical deep ocean wave, the wave length is on the order of 100 to 200 m. As described in U.S. Pat. No. 7,686,583, entitled "Cyclical Wave Energy Converter" and in co-filed U.S. patent application Ser. No. 13/569,988, entitled "Clustering of Cycloidal Wave Energy Converters," which are hereby incorporated by reference in their entirety, a single CycWEC or a clusters of CycWECs may be operable in modes that tend to cancel reactive forces or torque, so that mounting requirements can be reduced or eliminated, e.g., for a free floating installation. However, ocean floor mounted solutions may be preferable in terms of overall economic considerations compared to mooring line attached installations or free floating installations.

Figure 2A:
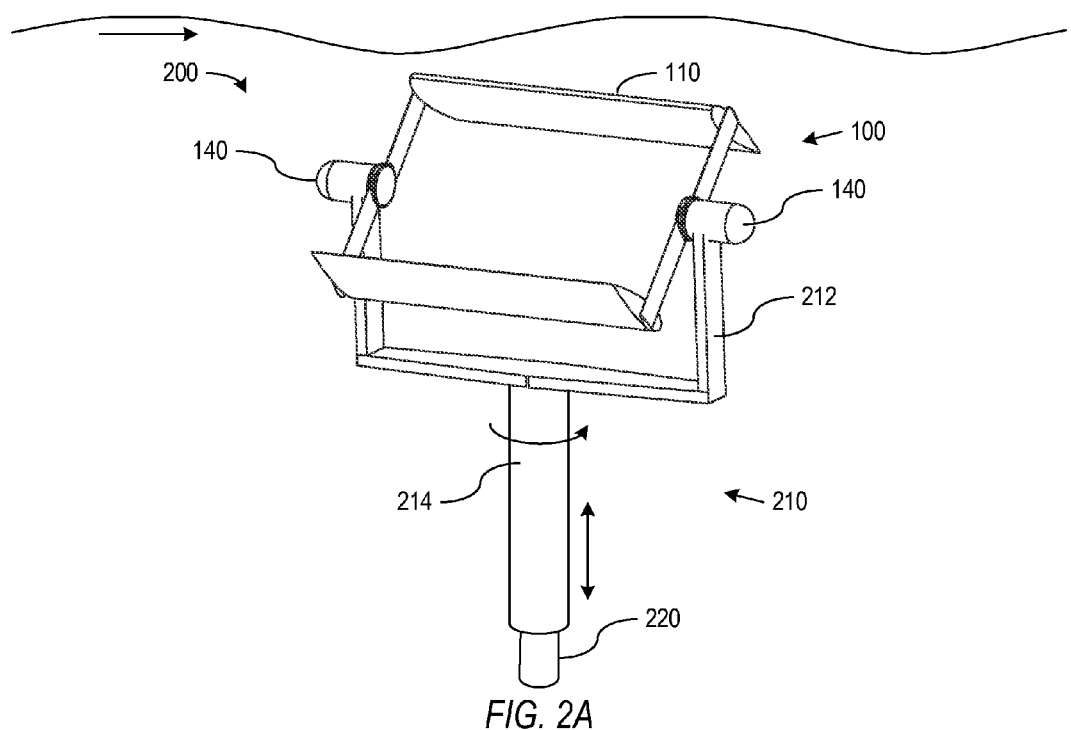
FIGS. 2A and 2B shows the top portions of pole mooring systems in accordance with embodiments of the invention respectively employing alternative systems for control of the depth and orientation of a wave energy converter.

FIG. 2A shows the upper portion of an ocean-floor mounting system 200 for a single WEC 100 of the type illustrated in FIG. 1A. WEC 100 is supported on both sides, i.e., at both generators 140, using a slider 210 with a wishbone-type support structure 212. Support structure 212 could be employed for any type WEC such as WEC 100, 102, or 104 of FIG. 1A, 1B, or 1C, but as described above a WEC having a generator on only one side may not require support on both sides as provided by support structure 212. In addition to opposing reactive forces, slider 210 includes a sleeve 214 that engages a pole 220 and permits both vertical movement and rotation of WEC 100 relative to a pole 220. Pole 220 may in turn be attached in a rigid fashion or otherwise anchored to the ocean floor (not shown). Some attachment structures, any of which may be used to attach pole 220 to the ocean floor, are described further below.

A lower portion of slider 210 in the embodiment of FIG. 2A forms a cap or sleeve 214 that is sized to slip over the top end of pole 220. Sleeve 214 may be free to move vertically on pole 220 and to rotate about pole 220. In operation, the action of waves on WEC 100 may have a natural tendency to rotate WEC 100 to a desired orientation of blades 110. (For optimal performance, the spans of blades 110 or the central axis of WEC 100 may need to be aligned parallel with the crests of the incoming wave.) A further mechanical system (not shown) such as a slewing ring with a motor having a sprocket attached to its shaft could be employed to automatically rotate the WEC into the desired orientation. In operation, WEC 100 including blades 110 may need to be entirely submerged to a depth that typically depends on the height or amplitude of incoming waves. In higher waves, WEC 100 would typically be submerged deeper in order to ensure that blades 110 remain submerged throughout their entire rotation about the central axis and do not pierce the water surface. A mechanical system, for example, a system employing a surface float and an offset attached to slider 210, might be employed to control the depth WEC 100.

Figure 2B:
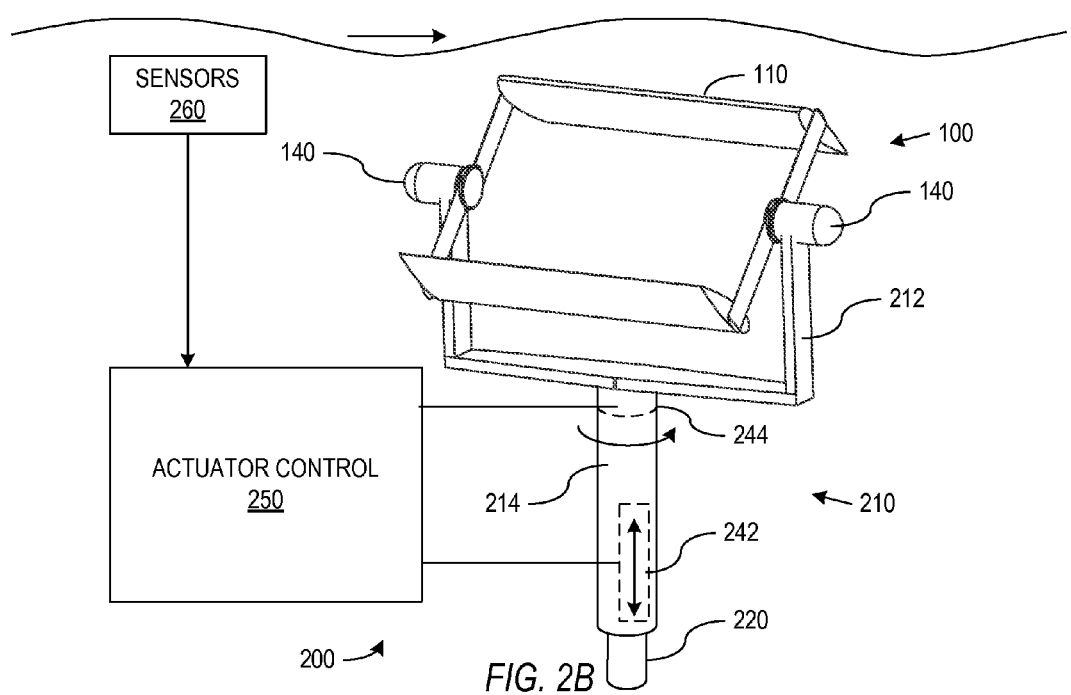

Slider 210 could alternatively or additionally employ active actuation to control the orientation or depth of WEC 100. For example, as illustrated in FIG. 2B, the vertical position of slider 210 with respect to pole 220 can be adjusted by means of a linear actuator 242 that may at least partially be housed inside sleeve 214. Linear actuator 242 could, for example, employ a hydraulic or pneumatic cylinder, a linear electrical actuator, a motor-driven rack-and-pinion mechanism, wire rope winch, or a system that alters the buoyancy of slider 210. A control system 250 could then operate linear actuator 242 to position WEC 100 with respect to the ocean surface. Control system 250 could particularly receive measurements of wave or ocean conditions and control linear actuator 242 so that WEC 100 including blades 110 as crests and troughs of waves pass over WEC 100. In a storm, the submergence of WEC 110 can be adjusted to be even further below the surface in order to prevent excessive loads to be imposed onto WEC 100, slider 210, or pole 220. In locations where there are tidal induced changes in ocean water level, the system can maintain a constant submergence depth of the CycWEC. For maintenance, linear actuator 242 can lift WEC 100 out of the water to allow for easy access without the need for divers or remotely operated underwater vehicles. Thus, the range of vertical motion of sleeve 200 may depend on the size of the waves expected and the radial size of WEC 100. Active or motor control of rotation of WEC 100 around pole 220 may be used to align WEC 100 with waves approaching from different directions. In the embodiment of FIG. 2B, support structure includes a yaw actuation mechanism 244. Yaw actuation may be accomplished by attaching a large gear concentric with pole 220 to support structure 212 and a motor with a small sprocket to sleeve 214, so that the motor can pivot support structure 212 and WEC 100 about the length axis of pole 220. Alternatively, yaw actuation mechanism 216 may attach to or engage structure on pole 220 to rotate the entire slider 210 relative to pole 220.

Control system 250 and sensors 260 for active control of the depth and orientation of WEC 100 may be employed to detect the direction, amplitude, wavelength, or period of the incoming waves and to operate actuators 242 and 244 to rotate, raise, or lower WEC 100 in response to the measurements. Control system 250 may be implemented using a computer with appropriate software to interpret measurements from sensors 260 and operate actuators 242 and 244. Control system 250 and sensors 260 may further be part of a control system for WEC 100, which may, for example, select a pitch angle or pitching cycle for blades 110 based on measurements of wave characteristics or other information.

Figure 3:
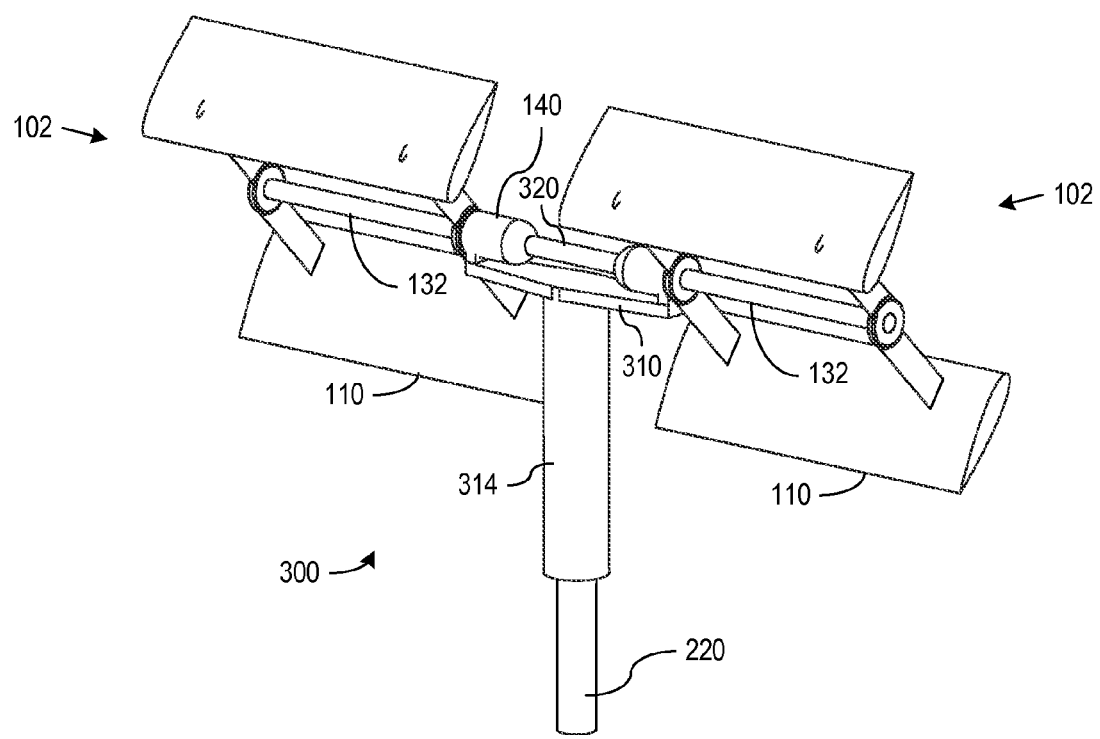
FIG. 3 shows a top portion of a pole mooring system in accordance with an embodiment of the invention employing a capped slider for multiple wave energy converters.

Mounting a single WEC on a pole as shown in FIG. 2A or 2B may not be the most cost efficient deployment since the support structure may be large relative to the size of a single WEC. FIG. 3 illustrates a mounting system 300 that may be more cost efficient. Mounting system 300 includes two WECs 102 that are symmetrically mounted on opposite sides of a slider 310. In the illustrated embodiment, each WEC 102 has a single generator 140 that is directly mounted on slider 310, so that slider 310 more directly bears reactive torques produced in generators 140. WECs 102 with a single generator 140 mounted on slider 310 may be employed to minimize the overall size of support structure on slider 310, but other types of WECs configurations such as the two generator configuration of WEC 100 could alternatively be employed.

Slider 310 employs a sleeve 314 that is able to slide and rotate on pole 220 as described above with reference to sleeve 214 of FIG. 2A or 2B. An advantage of mounting system 300 of FIG. 3 over the single-WEC mounting system of FIG. 2A or 2B is that rotation of mounting structure 310 about pole 220 can be easily controlled by controlling the operating parameters of the two WECs 102. For example, the pitch angle or the pitching cycle of the blades 110 of one WEC 102 may be different from the pitch angle or pitching cycle of the blades 110 of the other WEC 102 to create a difference between the reactive forces respectively on the two WECs 102, creating a torque that rotates slider 310 toward a target orientation. Thus, control of WECs 102 can be used for yaw movement or actuation that aligns WECs 102 with the incoming waves, and a separate yaw actuator (or motor) may not be needed in some embodiments of mounting system 300. However, yaw actuation through control of the pitching of blades 110 may increase the load on main shafts 132 at generators 140 with a large torque due to the eccentric lift force of blades 110, and that load needs to be sustained by slider 310 as well as the bearings or generators 140. Further, a connecting shaft 320 may be connected to or be an extension of the drive shafts of generators 140. Connecting shaft 320 may improve the structural strength of generators 140, in that, the main shaft of generators 140 in system 300 is effectively continuous and better able to balance opposing forces from blades 110. When the pitch angles of the two WECs 102 are different, connecting shaft 320 may provide leverage that reduces the differential load applied to individual bearings and reduces the moment carried by the support structure of slider 310. Additionally, while two generators 140 are shown in FIG. 3, in an alternative embodiment a single generator, e.g., of twice the power rating of generators 140, may be connected to the blades of both WECs 102, which may further reduce component count and cost.

Figure 4A:
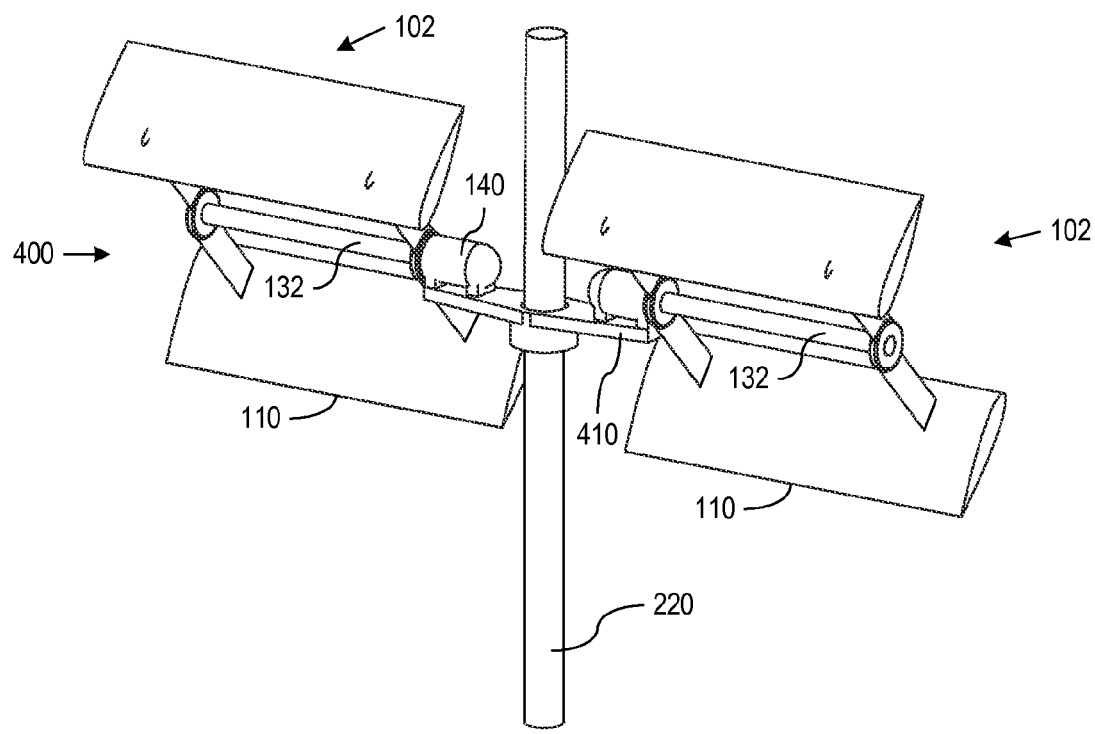
FIGS. 4A and 4B show top portions of pole mooring systems in accordance with alternative embodiments of the invention employing multiple wave energy converters on a slider with a top opening.
Figure 4B:
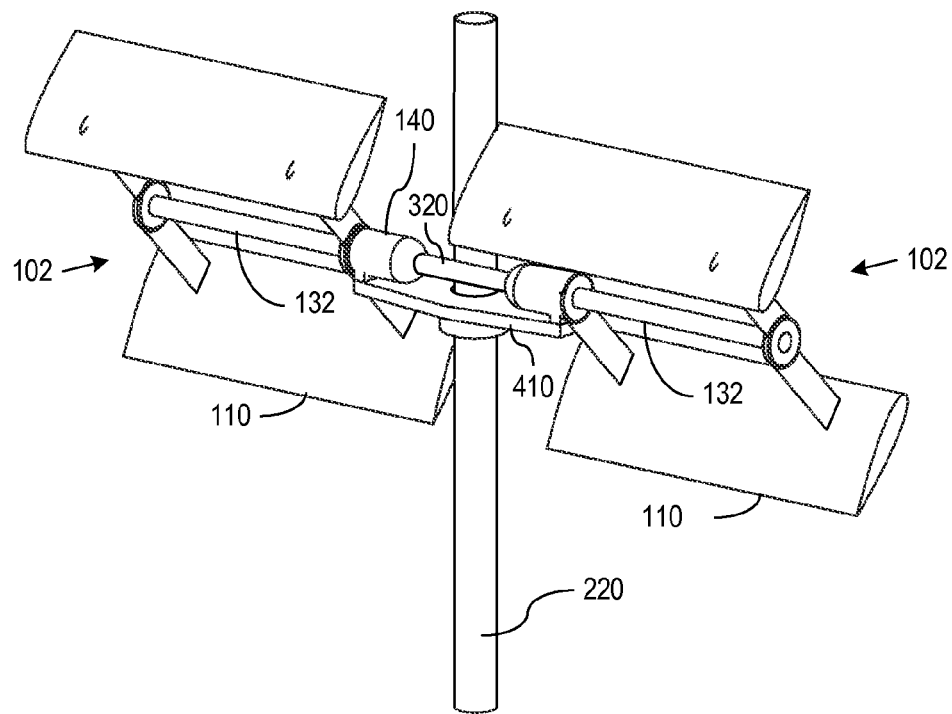

Extension shaft 320 extends above the end of pole 220, and slider 310 may form a cap over pole 220 since pole 220 cannot extend past connecting shaft 320. As a result the length of sleeve 314 may need to be at least as long as the range of vertical motion of slider 310. FIG. 4A shows an alternative mounting system 400 including two WECs 102 and two generators 140 with no connecting shaft between generators 140. As a result, pole 220 can extend up through a top opening of a slider 410 on which WECs 102 are mounted. WECs 102 in FIG. 4A are symmetrically mounted on opposite sides of the opening in slider 410, which may reduce the torque that WECs 102 apply to pole 220. Alternatively, slider 410 may allow mounting of WECs 102 to one side of pole 220, so that WECs 102 can employ a continuous or connecting shaft 320 that passes to one side of pole 220 as shown in FIG. 4B. Connecting shaft 320 may provide leverage that reduces the differential load applied to bearings in WECs 102 and opposite side moments that tend to bow slider 410. However, the asymmetric placement of WECs 102 on slider 410 of FIG. 4B may cause torque on slider 410 and pole 220. In either case, the height of slider 410 only needs to be sufficient to support the loads of WECs 102, and slider 410 may still have a range of motion up to the length of pole 220. Further, pole 210 could extend above the ocean surface, which may useful for identifying the location of pole 220 and submerged WECs 102.

Figure 5:
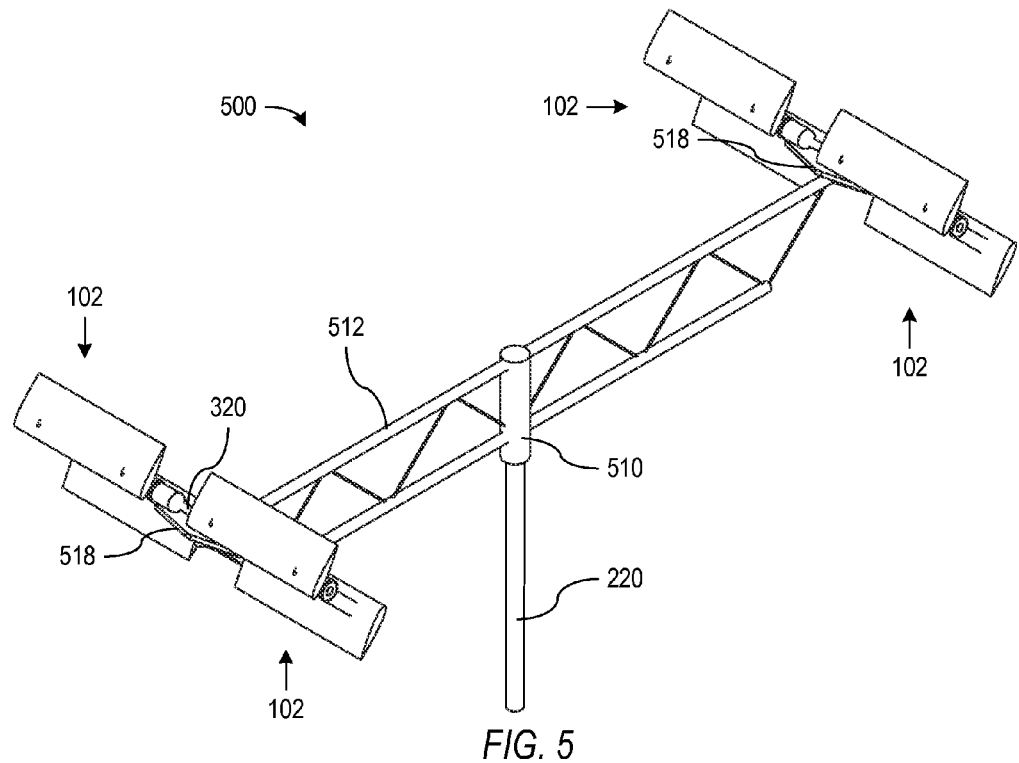
FIG. 5 shows a top portion of a pole mooring system in accordance with an embodiment of the invention employing a slider with a support structure for multiple wave energy converters.
Figure 6:
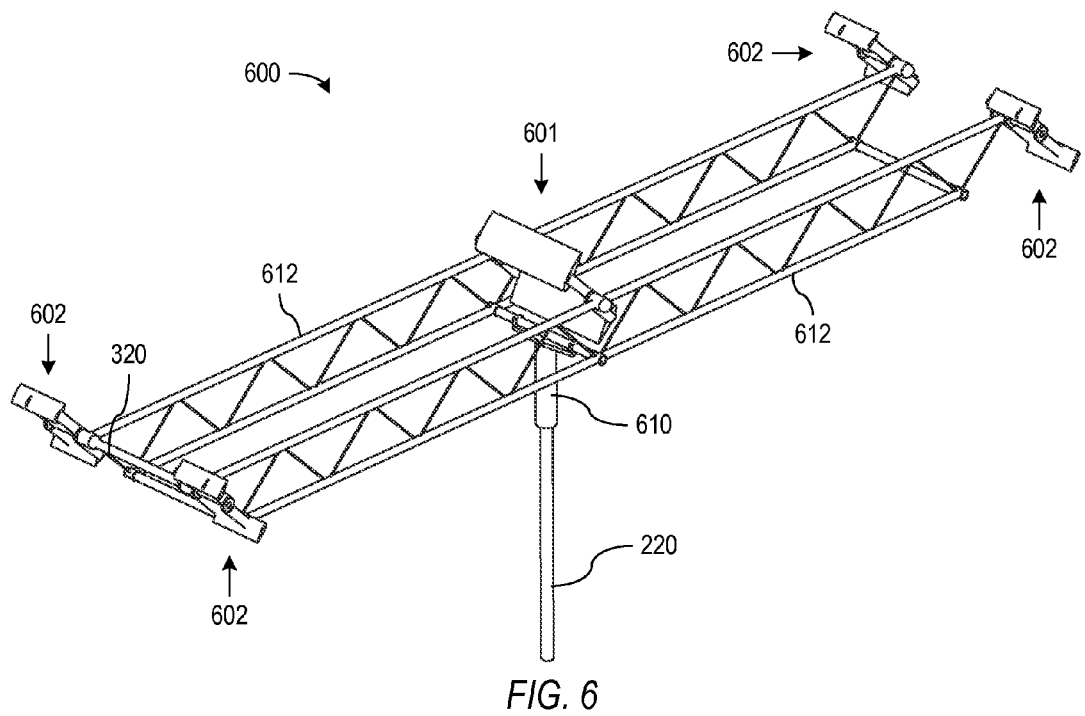
FIG. 6 shows a top portion of a pole mooring system in accordance with an embodiment of the invention employing a slider for a cluster of wave energy converters that provide cancellation of reactive forces and torques.

The pole mooring systems of FIGS. 2A, 2B, 3, 4A, and 4B have not been described for use with a cluster of WECs that are operated to mitigate the loads imposed on mounting pole 220 during operation of the WECs. FIGS. 5 and 6 respectively illustrate the use of pole mooring systems 500 and 600 with arrays or clusters of WECs 102 that may be arranged and operated to alleviate the lift loads, or, in the most favorable case, entirely eliminate the loads induced by operation of WECs 102. Clustering WECs 102 can thus reduce the structural requirements and cost for pole mooring systems 500 and 600, or allow pole mooring system 500 or 600 to be installed in deeper waters than what would otherwise be feasible.

Mooring system 500 of FIG. 5 can eliminate the lift loads using two pairs of double blade WECs 102, where the WECs 102 in each pair are separated from each other by a distance equal to or about equal to one half the wavelength of incoming waves. Slider 510 includes a support structure 512 including a truss on which WECs 102 are mounted. Each pair of WEC 102 particularly includes one WEC 102 near a down-wave end of support structure 512 and one WEC 102 near the up-wave end of support structure 512. WEC 102 on one or both ends of support structure 512 may be on slide mountings 518 that permit adjustment of the separation of the WECs 102 along the length of support structure 512, so that spacing of WECs 102 may be adjusted to accommodate changes in the wavelength of incoming waves. Alternatively, WECs 102 may have fixed mountings that are positioned to provide a separation that is equal to one half of the average wavelength of waves at the ocean location where system 500 is deployed. WECs 102 in system 500 can all be of the same size, and each WEC 102 can be operated so that each blade of the WEC 102 has a fixed pitch angle that is the negative of the pitch angle of the opposite blade of the WEC 102. With a half wavelength spacing, the rotation of WECs 102 near opposite ends of support structure 512 are 180° out of phase and produce equal but opposite lift forces throughout their synchronized rotation. While this operation cancels the lift loads, pole 220 and slider 510 still need to sustain a residual moment that is equal to twice the lift force times the spacing ($\lambda/2$) of the paired WECs 120. More generally N pairs of WECs 120, where N is a positive integer, can be operated in a similar manner to cancel the total lift force but leave a residual torque.

Mooring system 600 of FIG. 6 supports a cluster including one center WEC 601 and four outer WECs 602 mounted on a pole 220 and a slider 610 that allows adjustment of the depth and orientation of WECs 601 and 602. Slider 610 has a support structure including a pair of trusses 612. Each WEC 601 or 602 may be structurally identical to WEC 100, 102, or 104 of FIG. 1A, 1B, or 1C, but for reasons described further below, center WEC 601 may have blades with a surface area that is four times the surface area of corresponding blades in each outer WEC 602. Center WEC 601 is mounted half way between outer WECs 602 and may be between trusses 612 and above pole 220. Two pairs of outer WECs 602 may be respectively mounted on the two trusses 612 using a slide mounting system that allow adjustment of the spacing along the lengths of trusses 612 between two paired WECs 602. Outer WECs 602 can all be of the same size, but center WEC 102 may have a blade area that is four times the blade area of one outer WEC 602. For example, the four outer WECs 602 may have half the span and feature half the hydrofoil chord compared to center WEC 601. During operation of system 600, the spacing between the down-wave outer WECs 602 and the up-wave outer WECs 602 is a full wavelength ($\lambda$) of the incoming waves, and all of WECs 601 and 602 can be operated with blades at the same pitch angle. With the full wavelength spacing, the rotations of outer WECs 602 will be in phase with each other, but the rotation of center WEC 601, which is half way between outer WECs 602, is 180° out of phase with the rotation of WECs 602. With center WEC 601 having four times the blade area of one outer WEC 602, it can be shown that all forces and torques cancel internally within slider 610. This allows the cluster including WEC 601 and 602 maintain position without the need for a sophisticated feedback control station, which might be needed for free floating operation. At the same time, pole 220 only has to sustain minimal residual forces and torques that may be caused by currents or by operation at an off-design wavelength. Thus, all five WECs 601 and 602 could be attached to the beams in a fixed fashion with spacing based on expected wavelength of waves at the deployed location of system 600. Mooring system 600, thus, may avoid the need to be able to relocate the outer four WECs in response to changes in the wave length of the incoming wave. The up-wave and down-wave outer WECs 602 may employ a common shaft 320 as shown the down-wave WECs 602 or individual shafts as depicted for the up-wave WECs 602.

FIG. 6 illustrates the minimum size cluster that, in principle, can be operated entirely without any ocean floor attachment or with a minimal capacity mooring system. Co-filed U.S. patent application Ser. No. 13/569,988, entitled "Clustering of Cycloidal Wave Energy Converters," further describes how greater numbers of WECs can be clustered and operated to minimize or eliminate reactive loads, so that a large cluster of WECs may be deployed using a single mooring pole.

The upper portions of mooring system including a central pole 220 have been described above without specifically describing how pole 220 may be attached to the ocean floor. FIGS. 7, 8, 9, and 10 illustrate some examples of systems for attaching a pole to the ocean floor, and each of those systems as well as other systems that may be known in the art or subsequently developed may be employed as the bottom portion of any of above mooring systems. It may be, however, that individual mounting options are more favorably combined with specific ocean floor attachments.

One anchoring system for pole 220 simply embeds the bottom of pole 220 in the ocean floor. This construction is commonly referred to as a monopile. Pole 220 will generally need to be embedded into ocean floor at least to a depth selected according to the structural loads to be sustained, the length of pole 220, and the load bearing capabilities of the material, e.g., soil or rock, of the ocean floor. For example, pole 220 can be driven directly into soft ground or inserted into a predrilled hole and affixed using grout for rock type installations. A monopile system provides simple and economical anchoring of pole 220 to the ocean floor but may be limited to shallower ocean depth due to the small foot print of the attachment and the length of the lever arm associated with pole 220.

Figure 7:
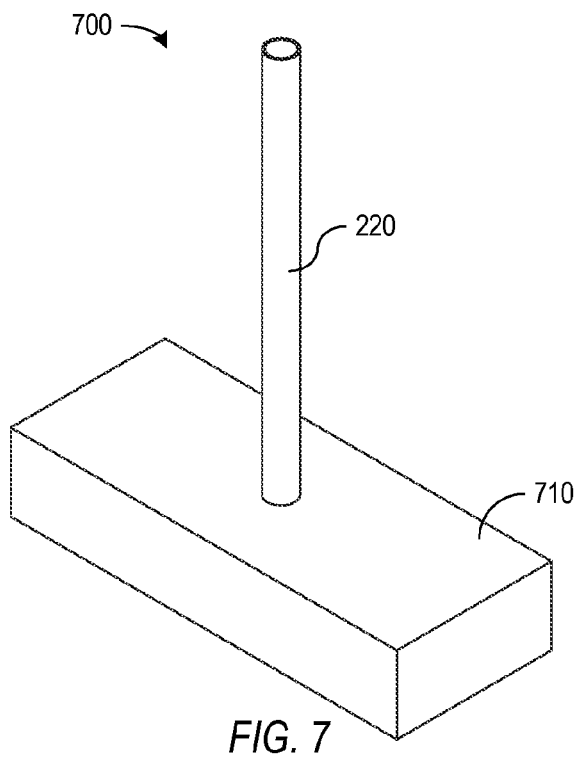
FIG. 7 shows a bottom portion of a pole mooring in accordance with an embodiment of the invention employing a bottom weight.

FIG. 7 illustrates an anchoring system 700 that may be referred to as a gravity based attachment. Anchoring system 700 attaches pole 220 to a large concrete or steel structure or counter weight 710 that can be filled with ballast. Counter weight 710 may have a long dimension that is aligned with the dominant wave direction for most efficient installation.

Figure 8:
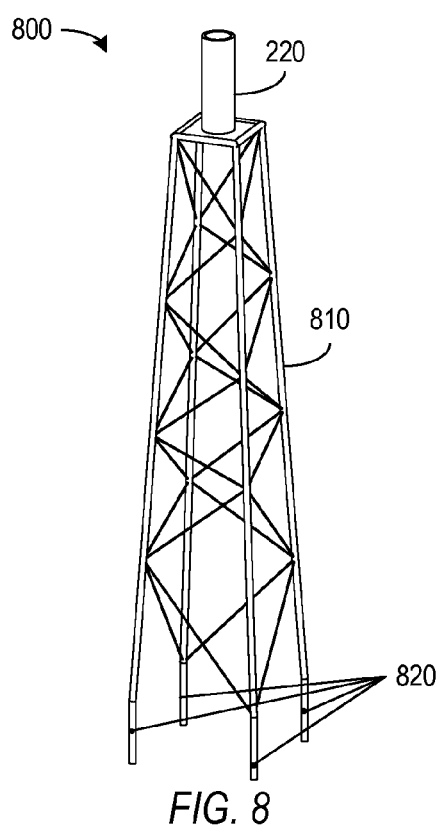
FIG. 8 shows a bottom portion of a pole mooring in accordance with an embodiment of the invention employing truss tower embedded in a sea floor.
Figure 9:
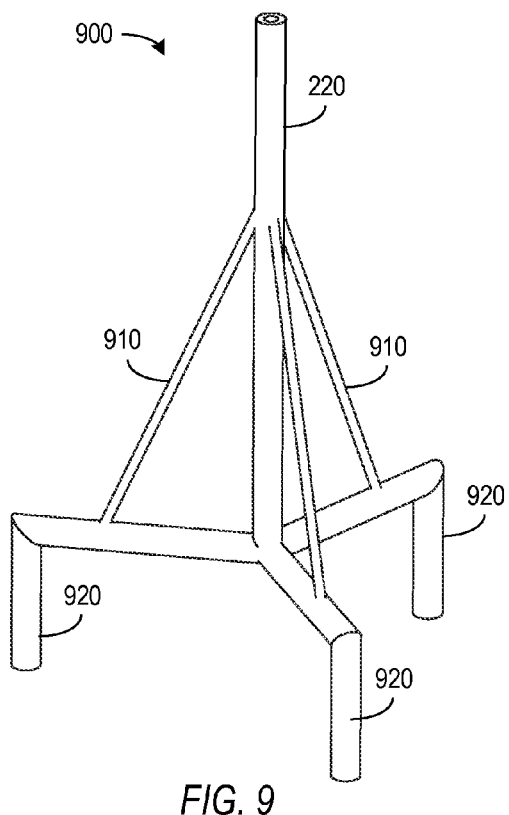
FIG. 9 shows a bottom portion of a pole mooring in accordance with an embodiment of the invention employing a tripod embedded in a sea floor.

FIGS. 8 and 9 illustrate jacket and tripod type foundations 800 and 900 that may be used for anchoring in deeper waters. Foundation 800 of FIG. 8 includes a truss tower 810 to which pole 220 is connected. Truss tower 810 has a number of legs that may be embedded in the ocean floor using the same techniques as used for the monopile foundation. With foundation 900 of FIG. 9, pole 220 and braces 910 are similarly connected to a number (particularly three) legs 920 that may be embedded in the ocean floor. Both foundations 800 and 900 allow for a wider base anchoring to the ocean floor and thus provide a more efficient structural setup when compared to the monopile foundation. Foundations 800 and 900 can thus be installed in deeper waters, though, and allow extension of WEC installations to depths that some other foundations cannot achieve. However, foundations 800 and 900 may be more expensive and more difficult to deploy.

Figure 10:
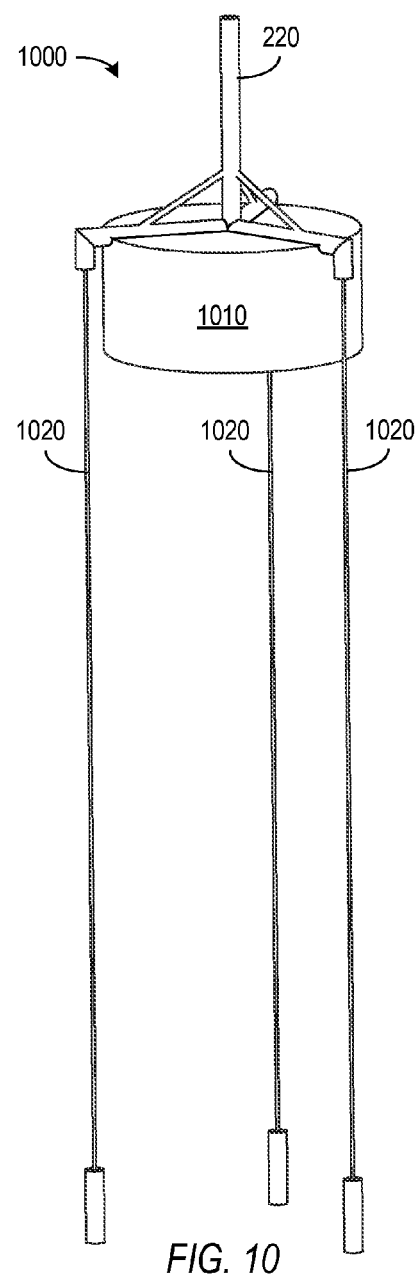
FIG. 10 shows a bottom portion of a pole mooring in accordance with an embodiment of the invention employing an anchored float.

For yet deeper water installations, a tension leg tripod (or multi-pod) foundation 1000 as shown in FIG. 10 can be used. In foundation 1000, pole 220 attaches to a submersed float 1010 providing buoyancy that is constrained by tendons 1020 attached to foundations on the sea floor. Foundation 1000 provides limited stiffness in the horizontal direction and may be best used for the WEC installation achieving partial or full load cancellation such as described above with reference to FIGS. 5 and 6.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system comprising:
a pole attached to a floor of an ocean;
a slider mounted on the pole in a manner that permits the slider to move vertically along the pole and rotate about the pole;
a first cycloidal wave energy converter mounted on the slider;
a sensor system to measure characteristics of incoming waves; and
a control system that controls sliding of the slider to change a depth of the first cycloidal wave energy converter toward a target depth that is selected according to the characteristics of the incoming waves.

2. The system of claim 1, further comprising a second cycloidal wave energy converter mounted on the slider.

3. The system of claim 2, wherein the control system is further connected to the first and second wave energy converters and operable to control operating parameters of the first and second wave energy converters so that a difference between a first reactive force on the first wave energy converter and a second reactive force on the second wave energy converter rotates the slider.

4. The system of claim 2, wherein the slider comprises a first support structure, the first wave energy converter is mounted near a down-wave end of the first support structure, and the second wave energy converter is mounted near an up-wave end of the first support structure.

5. The system of claim 4, wherein the first support structure provides a separation between the first and second wave energy converters that is one half of an expected wavelength of incoming waves.

6. The system of claim 4, wherein the first support structure provides a separation between the first and second wave energy converters that is equal to an expected wavelength of incoming waves.

7. The system of claim 4, further comprising third, fourth, and fifth wave energy converters mounted on the slider, wherein:
the slider further comprises a second support structure;
the third wave energy converter is mounted near a first end of the second support structure;
the fourth wave energy converter is mounted near a second end of the second support structure; and
the fifth wave energy converter is mounted between the first and second support structures.

8. The system of claim 2, wherein the slider comprises an active mounting system operable to vary a separation between the first and second wave energy converters according to a wavelength of incoming waves.

9. The system of claim 2, wherein the slider comprises a top opening through which the pole extends between the first and second wave energy converters.

10. The system of claim 1, further comprising a linear actuator coupled to control the depth of the first wave energy converter in the ocean.

11. A system comprising:
a pole attached to a floor of an ocean;
a slider mounted on the pole in a manner that permits the slider to move vertically along the pole and rotate about the pole;
a first wave energy converter mounted on the slider;
a second wave energy converter mounted on the slider; and
a connecting shaft connected between a drive shaft of the first wave energy converter and a drive shaft of the second wave energy converter.

12. The system of claim 11, wherein the slider comprises a top opening through which the pole extends between the first and second wave energy converters, and the connecting shaft passes to one side of the pole and the top opening.

13. A method comprising:
mounting a cluster of wave energy converters on a slider that engages a pole;
measuring characteristics of incoming waves;
sliding the slider vertically along the pole to adjust a depth at which the wave energy converters are submerged in water, wherein sliding the slider vertically changes the depth of the wave energy converters toward a target depth that is selected according to the characteristics of the incoming waves; and
rotating the slider about the pole to orient the wave energy converters for a direction of incoming waves.

14. The method of claim 13, wherein rotating the slider comprises altering operating parameters of a selected one of the wave energy converters so that a difference between a reactive force on the selected wave energy converter and any reactive forces on the other wave energy converters cause the slider to rotate.

15. The method of claim 13, wherein rotating the slider orients the wave energy converters so that central rotation axes of the wave energy converters are parallel with crests of incoming waves.

16. The method of claim 13, rotating the slider orients the wave energy converters so that a first of the wave energy converters is up wave from a second of the wave energy converters.

17. The method of claim 13, wherein the wave energy converters comprise cycloidal wave energy converters.

* * * * *